United States Patent
Hasegawa et al.

(10) Patent No.: US 6,913,000 B2
(45) Date of Patent: Jul. 5, 2005

(54) ENGINE FUEL DELIVERY SYSTEM

(75) Inventors: Kazuya Hasegawa, Tokyo (JP);
Yutaka Matayoshi, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/702,640

(22) Filed: Nov. 7, 2003

(65) Prior Publication Data

US 2004/0094126 A1 May 20, 2004

(30) Foreign Application Priority Data

Nov. 14, 2002 (JP) ........................................ 2002-330145

(51) Int. Cl.⁷ .............................................. F02M 37/04
(52) U.S. Cl. ...................................... 123/508; 123/507
(58) Field of Search ................................ 123/508, 507, 123/512, 510, 456

(56) References Cited

U.S. PATENT DOCUMENTS 5,197,438 A * 3/1993 Kumano et al. ............ 123/506
5,255,643 A * 10/1993 Mochizuki et al. ..... 123/179.17
6,035,830 A * 3/2000 Saito .......................... 123/457

FOREIGN PATENT DOCUMENTS

| JP | 07-167003 A | 7/1995 |
| JP | 10-009074 A | 1/1998 |

* cited by examiner

Primary Examiner—Mahmoud Gimie
(74) Attorney, Agent, or Firm—Shinjyu Global IP Counselors, LLP

(57) ABSTRACT

An engine fuel delivery system is provided to raise the fuel pressure rapidly in the initial stage of engine starting without increasing the cranking load, thereby making it possible to achieve an atomized fuel spray through high-pressure fuel injection, improve the fuel efficiency, and reduce emissions. The engine fuel delivery system uses a variable transmission mechanism that is configured to change the drive rotational ratio of a power transmission path between a crankshaft of an engine and a high-pressure fuel pump. The variable transmission mechanism controls the rotational speed of the high-pressure fuel pump to a rotational speed that is higher than the normal pump rotational speed in the initial stage of engine starting after the engine has been cranked to complete explosion.

20 Claims, 6 Drawing Sheets

ENGINE FUEL DELIVERY SYSTEM

BACKGROUND OF THE INVENTION

1. Field of the Invention

The present invention generally relates to an improvement for engine fuel delivery systems. More specifically, the present invention relates to an engine fuel delivery system that is especially useful in automobile engines that employ compression ignition and direct fuel injection, such as diesel engines.

2. Background Information

One example of a diesel engine technology for achieving low fuel consumption and low emissions is disclosed in Japanese Laid-Open Patent Publication No. 7-167003. This publication discloses a practical diesel engine that uses an accumulator vessel called a "common rail." This technology, the engine is provided with a plurality of fuel injection valves for each cylinder of the engine, a high-pressure fuel pump rotatably driven using the engine output as a power source, and a common rail provided in the high-pressure line that fluidly connects the fuel injection valves and the high-pressure pump together. Since the fuel is maintained at a high pressure inside the common rail, stable high-pressure fuel injection can be accomplished at all times and the combustion efficiency can be improved through atomization of the fuel spray.

When the high-pressure fuel pump is driven by the engine at a fixed ratio of the engine rotational speed, the pressure generated inside the common rail by the high-pressure pump increases substantially proportionally to the engine rotational speed. Thus, during the initial stage of engine starting when the engine rotational speed is low, it is difficult to sufficiently increase the fuel pressure inside the common rail. Consequently, during the initial stage of engine starting, the atomization of the fuel spray resulting from high fuel pressure, which is the essential benefit of using a common rail, cannot be achieved. More particularly, in the case of cold starting, the period of unstable combustion is long, presenting the possibility of degraded fuel consumption and increased emissions of HC, NOx, and smoke.

Japanese Laid-Open Patent Publication No. 10-9074 discloses a technology for a direct fuel injection gasoline engine in which a variable speed device is inserted in the power transmission path between a camshaft driven by the engine and the high-pressure fuel pump. During the period from starting of the engine using the starter key until complete explosion of the engine, i.e., during cranking of the engine when the starter motor is substantially driving the engine, the fuel pressure is increased for a short period beginning from engine starting by increasing the speed of the variable speed device.

In view of the above, it will be apparent to those skilled in the art from this disclosure that there exists a need for an improved engine fuel delivery system. This invention addresses this need in the art as well as other needs, which will become apparent to those skilled in the art from this disclosure.

SUMMARY OF THE INVENTION

It has been discovered that during cranking of the engine, the engine is not running independently and is rotationally driven by the starter motor. If the speed of the high-pressure fuel pump is increased during cranking, the cranking load increases and the load on the starter motor becomes large. This leads to a need for a large-capacity, large-sized starter motor.

More specifically, the drive torque required for a high-pressure fuel pump in a diesel engine is extremely large because the fuel pressure required in a diesel engine is 1000 bar or higher, which is 10 to 20 times higher than the fuel pressure required in a gasoline engine. Consequently, when the technology of Japanese Laid-Open Patent Publication No. 10-9074 is applied to a diesel engine and the speed of the high-pressure fuel pump is increased during cranking (i.e., when the starter motor is driving the engine), the problem of insufficient capacity of the starter motor is even larger than in the case of a gasoline engine.

The present invention was conceived in view of this problem. Thus, one object of the present invention is to provide a new engine fuel delivery system that can increase the fuel pressure rapidly in the initial stage of engine starting without increasing the load during cranking, thereby making it possible to achieve an atomized fuel spray through high-pressure fuel injection, improve the fuel efficiency, and reduce emissions.

An engine fuel delivery system according to the present invention has a plurality of fuel injection valves, a high-pressure fuel pump, an accumulator vessel, and a variable transmission mechanism. The fuel injection valves are configured and arranged to inject fuel into cylinders of an engine.

The high-pressure fuel pump is configured and arranged to be driven by an engine output at a pump rotational speed to pressurize the fuel to be injected by the fuel injection valves. The accumulator vessel is configured and arranged to be provided in a high pressure line connecting the high-pressure fuel pump to the fuel injection valves. The variable transmission mechanism is configured and arranged to vary a drive rotational ratio in the power transmission path between the engine output and an input of the high-pressure fuel pump. The variable transmission mechanism is further configured and arranged to control the pump rotational speed of the high-pressure fuel pump to a prescribed high pump rotational speed that is higher than a prescribed normal pump rotational speed used during an initial stage of engine starting after complete engine explosion has been achieved by cranking.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
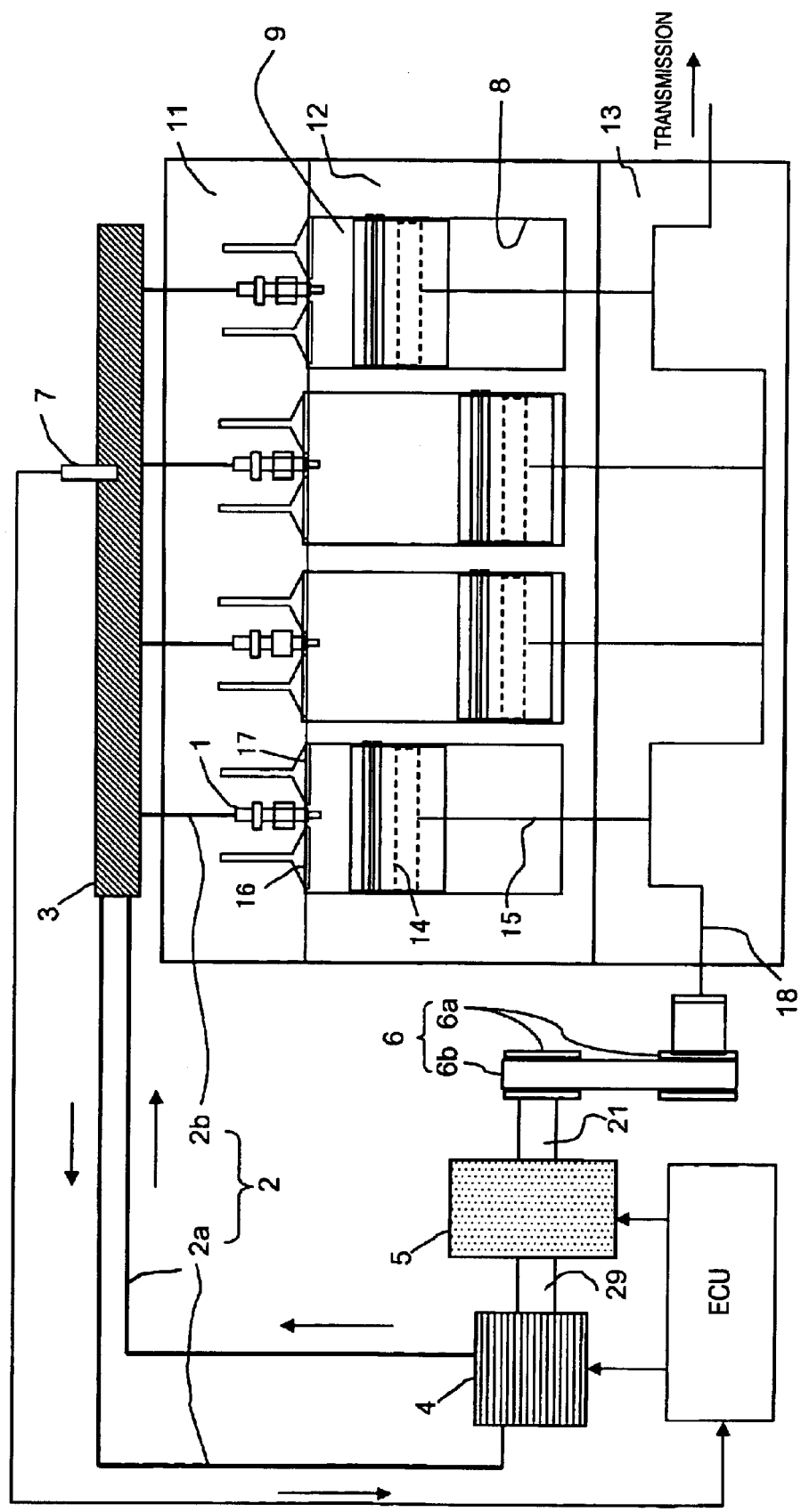
FIG. 1 is a diagram showing an engine in which a fuel delivery system according to the present invention has been applied.

Referring initially to FIG. 1, a system diagram is illustrated in accordance with a first embodiment of the present invention. In particular, FIG. 1 illustrates a system diagram of a four-cylinder diesel engine in which a compression ignition engine fuel delivery system according to the present invention has been applied.

As discussed below, the fuel delivery system present invention enables the fuel pressure to be raised quickly in the initial stage of engine starting without increasing the load during cranking of the engine. As a result, the atomization of the fuel spray through high-pressure fuel injection can be accomplished and improved fuel efficiency and reduced emissions can be contrived.

The diesel engine has a plurality of fuel injection valve 1 that are fluidly connected by a high pressure line 2 having a common rail (accumulator vessel) 3 to a high-pressure pump 4. A variable rotation ratio transmission mechanism 5 drives the high-pressure pump 4. Preferably, a transmission device 6 is provided to drive the variable rotation ratio transmission mechanism 5 which in turn drives the high-pressure pump 4. A pressure sensor (pressure detecting device) 7 is provided in the common rail 3 to produce a control signal indicative of the fuel pressure in the common rail 3.

The diesel engine has four cylinders 8 that form part of four combustion chambers 9 together with a cylinder head 11 and a cylinder block 12. The cylinder block 12 has a crankcase 13 mounted below the cylinder block 12. The four cylinders 8 are arranged in series in the cylinder block 12 of the engine with a piston 14 being provided in each of the cylinders 8 such that the pistons 14 can move slidingly therein. Thus, the combustion chambers 9 are formed by the crown surfaces of each of the pistons 14, the inside wall surfaces of each cylinder 8, and the under surface of the cylinder head 11. The cylinder block 12 is provided with a plurality of intake valves 16 that are disposed downstream of an intake port (not shown). The intake valves 16 are configured to direct intake air into the combustion chambers 9 and serve to open and close the intake ports. The cylinder block 12 is also provided with a plurality of exhaust valves 17 that are disposed upstream of an exhaust port (not shown). The exhaust valves 17 are configured to discharge exhaust gases from the combustion chambers 9 and serve to open and close the exhaust ports. Connecting rods 15 link the pistons 14 to a crankshaft 18 in a conventional manner. The crankshaft 18 is disposed inside the crankcase 13 mounted below the cylinder block 12. The crankshaft 18 extends in the direction in which the cylinders 9 are lined up and is supported in such a manner that it can rotate about an axis.

Each cylinder 8 is provided with one of the fuel injection valve 1 that has its injection tip arranged approximately along the center axis of the combustion chamber 9 such that it can inject fuel directly into the combustion chamber 9. Air delivered from the air intake port to the combustion chambers 9 through the intake valves 16 is compressed to a high temperature and high pressure by the compression work of the pistons 14. When fuel is injected into this high-temperature, high-pressure combustion chambers 9 from the fuel injection valves 1, the fuel is ignited and combusted. The expansion work obtained from the combustion rotationally drives the crankshaft 18 and is extracted as engine output.

The common rail 3, which is an accumulator vessel, is provided in the high pressure line 2 that fluidly connects the four fuel injection valves 1 to the single high-pressure fuel pump 4 that is configured to pressurize the fuel. The high-pressure line 2 comprises two first high-pressure lines 2a that communicatively connect the high-pressure fuel pump 4 to the common rail 3 and four second high-pressure lines 2b that supply high-pressure fuel from the common rail 3 to the fuel injection valves 1. The pressure sensor 7 is mounted to the common rail 3 as a device that is configured to detect the pressure of the fuel within the common rail 3.

The high-pressure fuel pump 4 is connected to one end of the crankshaft 18 protruding from the cylinder block 12 and is mechanically driven in a rotational manner by a power transmission path that is driven by the rotational power of the crankshaft 18, i.e., the output of the engine. In the power transmission path between the crankshaft 18 and the high-pressure fuel pump 4, there is provided the variable rotation ratio transmission mechanism 5 that is configured such that it can vary the drive rotation ratio between the crankshaft 18 and the high-pressure fuel pump 4. The variable rotation ratio transmission mechanism 5 is connected to the end of the crankshaft 18 through a pair of pulleys 6a and a belt 6b, which constitute the transmission device 6.

An engine control unit ECU is provided to control the operations of the high-pressure fuel pump 4 and the variable rotation ratio transmission mechanism 5. In the present invention, the operations of the high-pressure fuel pump 4 and the variable rotation ratio transmission mechanism 5 are controlled by the engine control unit ECU such that the pump rotational speed of the high-pressure fuel pump 4 is increased after the engine reaches the complete explosion state. Basically, this means that the pump rotational speed of the high-pressure fuel pump 4 is increased after the engine speed reaches a point of independent operation so that basically the engine is rotating at the engine idling speed. The engine idling speed varies from engine to engine, but for currently most diesel engines have an engine idling speed of approximately 600 to 800 rpm.

During normal operation, the engine control unit ECU controls the high-pressure fuel pump 4 to a normal pump rotational speed that is the same as the engine rotational speed (1:1). Thus, when the engine control unit ECU controls the high-pressure fuel pump 4 to a high pump rotational speed, the speed rotational of the high-pressure fuel pump will be a specific speed ratio with respect to the engine speed that is greater than one (1). For example, the engine control unit ECU controls the high-pressure fuel pump 4 to a high pump rotational speed having a speed ratio of approximately two (2) with respect to the engine speed. Increases in pump friction and the strength of the gears will determine the limit value (setting value), which will vary depending on the engine.

Although in the example shown in FIG. 1 the engine output used to drive the high-pressure fuel pump 4 is obtained from the crankshaft 18, other arrangements are also acceptable so long as the engine output is extracted mechanically. For example, an arrangement in which the engine output is extracted from a camshaft that drives the intake and exhaust valves could be used.

Figure 2:
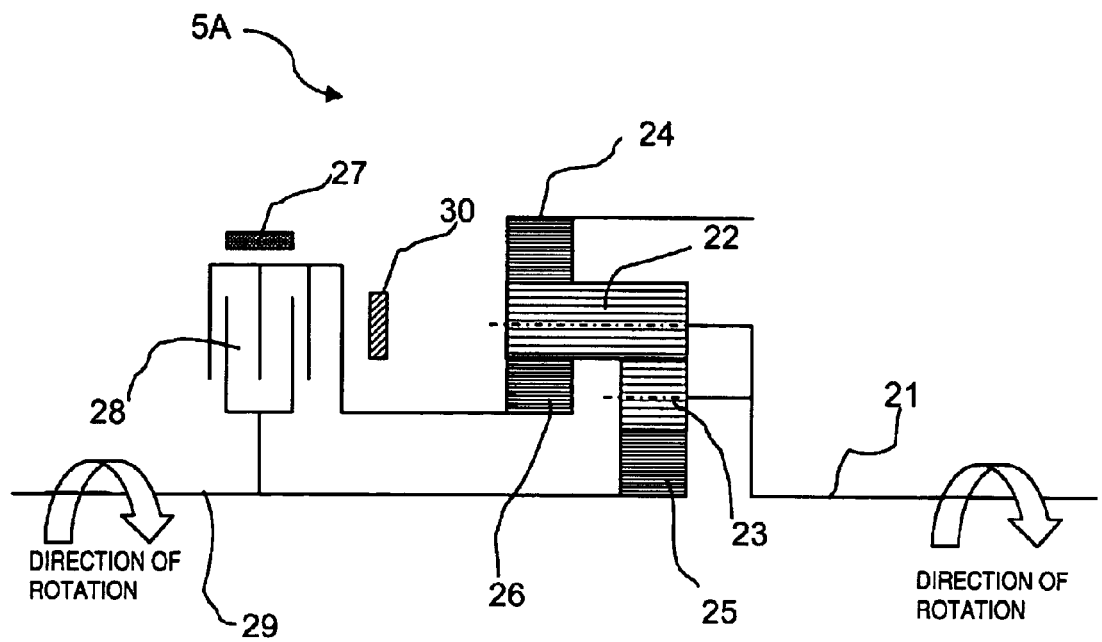
FIG. 2 is a cross sectional view showing a variable rotation ratio transmission mechanism in accordance with the first embodiment of the present invention.

The variable rotation ratio transmission mechanism 5 according to the first embodiment is a Ravigneaux-type two-speed planetary gear mechanism 5A that uses a Ravigneaux gear train, which is one type of planetary gear train as diagrammatically illustrated in FIG. 2. The planetary gear mechanism 5A is installed between an input shaft 21 that rotates integrally with the crankshaft 18 of the engine via the transmission device 6 and an output shaft 22 that connects to the high-pressure fuel pump 4. The planetary gear mechanism 5A serves to change the rotation ratio between the two shafts 21 and 29. The planetary gear mechanism SA has a first planet gear 22 and a second planet gear 23 that rotate (revolve) with the input shaft 21, a ring gear 24 that is fixed to the cylinder block 12, and a first sun gear 25 and a second sun gear 26 that can rotate with the output shaft 29. The outward facing side of the first planet gear 22 meshes with the ring gear 24 and the inward facing side meshes with the second sun gear 26 and the second planet gear 23. The outward facing side of the second planet gear 23 meshes with the first planet gear 22 and the inward facing side meshes with the first sun gear 25. The second sun gear 26 is coupled to the output shaft 29 through a clutch 28. The clutch 28 preferably is provided with a brake band 27.

Assuming the tooth count of the first sun gear 25 is Za1 and the tooth count of the second sun gear 26 is Za2, the speed increase ratio I (or speed reduction ratio) between the input shaft 21 and the output shaft 29 is 1 when the clutch 28 alone is operated (fastened) and the brake band is released. Meanwhile, the speed increase ratio I is 1/(1+Za2/Za1) when the clutch 28 is released and the brake band 27 is operated. With this planetary gear mechanism 5A, the rotational speed of the high-pressure fuel pump 4 can be switched between a normal pump rotational speed having the fixed ratio I=1 with respect to the engine rotational speed and a high pump rotational speed having the fixed ratio I=1/(1+Za2/Za1) with respect to the engine rotational speed, which is faster than the normal pump rotational speed.

Figure 6A:
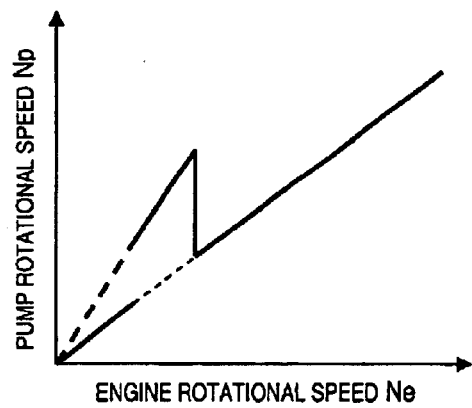
FIGS. 6(a) and 6(b) are characteristic diagrams showing how the pump rotational speed and the common rail pressure change with respect to the engine rotational speed in an engine according to the present invention.
Figure 6B:
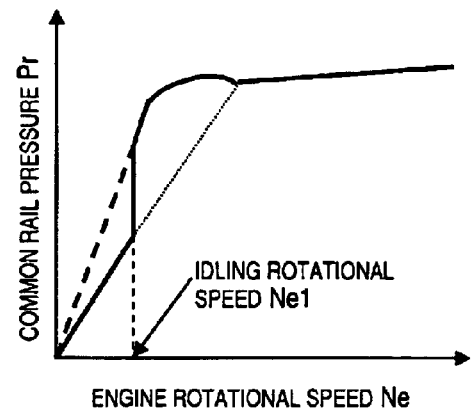

FIGS. 6(a), 6(b), 7(a) and 7(b) are characteristic plots showing how the pump rotational speed (rotational speed of the output shaft 29) Np and the pressure Pr inside the common rail 3 change with respect to the engine rotational speed Ne. FIGS. 6(a) and 6(b) correspond to this embodiment of the present invention, while FIGS. 7(a) and 7(b) correspond to a comparative example that is not equipped with a variable rotation ratio transmission mechanism.

Figure 7A:
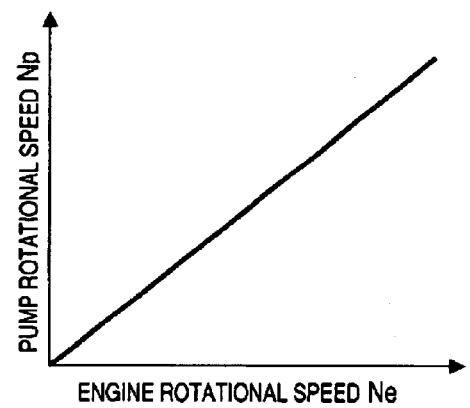
FIGS. 7(a) and 7(b) are characteristic diagrams showing how the pump rotational speed and the common rail pressure change with respect to the engine rotational speed in an engine according to a comparative example.
Figure 7B:
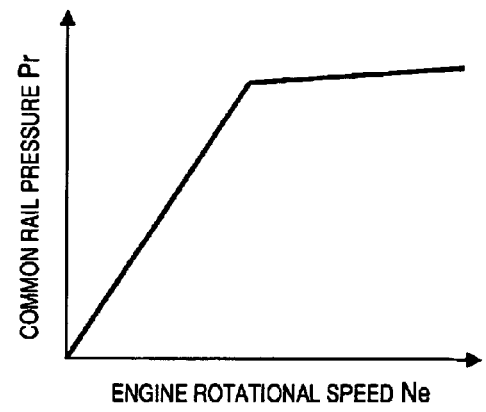

When the high-pressure fuel pump is driven by the engine at a fixed ratio of the engine rotational speed as shown in FIG. 7(a), the pressure Pr generated inside the common rail by the high-pressure pump increases substantially proportionally to the engine rotational speed Ne as shown in FIG. 7(b). In the initial stage of engine starting, the common rail pressure Pr is low and it cannot be increased quickly when the ratio between the engine rotational speed and the pump rotational speed is not changed, as in the comparative example of FIGS. 7(a) and 7(b). In other words, during the initial stage of engine starting when the engine rotational speed is low, it is difficult to sufficiently increase the fuel pressure inside the common rail. Consequently, sufficient atomization of the fuel spray cannot be achieved and the period of unstable combustion during starting, particularly cold starting, is long. This also leads to a possibility that the amount of emissions discharged will increase. More particularly, in the case of cold starting, the period of unstable combustion is long, presenting the possibility of degraded fuel consumption and increased emissions of HC, NOx, and smoke.

Conversely, with this embodiment of the present invention, as shown in FIGS. 6(a) and 6(b), in the initial stage of engine starting after complete engine explosion has been achieved by cranking (more specifically, after the engine rotational speed has reached an idling speed Nel, such as approximately 600 to 800 rpm), the rotational speed of the high-pressure fuel pump 4 is increased from the normal pump rotational speed to the high pump rotational speed and the fuel pressure is increased to the target pressure early. As a result, the period of unstable combustion that occurs in the initial stage of engine starting is greatly shortened and the release of such emissions as HC, NOx, and smoke can be sufficiently suppressed. A large portion of the emissions discharged is discharged during cold starting. Greatly reducing the quantity of cold start emissions has the effect of allowing the catalyst capacity to be reduced.

More specifically, in the initial stage of engine starting after complete engine explosion has been achieved by cranking, the clutch 28 of the planetary gear mechanism 5A is released and the brake band 27 is operated, thereby increasing the pump rotational speed and increasing the fuel pressure inside the common rail 3 early. The fuel pump 4 can then be returned to operation at the normal pump rotational speed by releasing the brake band 27 and operating the clutch 28 when the signal from the pressure sensor 7 mounted to the common rail 3 indicates that the target fuel pressure has been reached. The planetary gear mechanism 5A has a holding mechanism 30, such as a return spring or the like, that normally holds it mechanically in a state in which the clutch 28 is fastened and the brake band 27 is released. Thus, the planetary gear mechanism 5A is configured such that it is operated and shifted into the setting state corresponding to the high pump rotational speed, i.e., the brake band 27 is fastened and the clutch 28 is released, only when the pump rotational speed is to be increased. As a result, in the event that the planetary gear mechanism SA should not operate properly due to a mechanical failure or the like, the pump rotational speed will not increase excessively because the holding mechanism 30 holds the pump rotational speed at the normal pump rotational speed, providing excellent reliability.

The engine control unit ECU preferably includes a microcomputer with a control program that controls the operations of the high-pressure fuel pump 4 and the variable rotation ratio transmission mechanism 5 as discussed below in accordance FIG. 3 or 5. In the present invention, the operations of the high-pressure fuel pump 4 and the variable rotation ratio transmission mechanism 5 are controlled by the engine control unit ECU such that the pump rotational speed of the high-pressure fuel pump 4 is increased after the engine reaches the complete explosion state. The engine control unit ECU can also include other conventional components such as an input interface circuit, an output interface circuit, and storage devices such as a ROM (Read Only Memory) device and a RAM (Random Access Memory) device that are needed and/or desired to carryout the present invention. It will be apparent to those skilled in the art from this disclosure that the precise structure and algorithms for the engine control unit ECU can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 3:
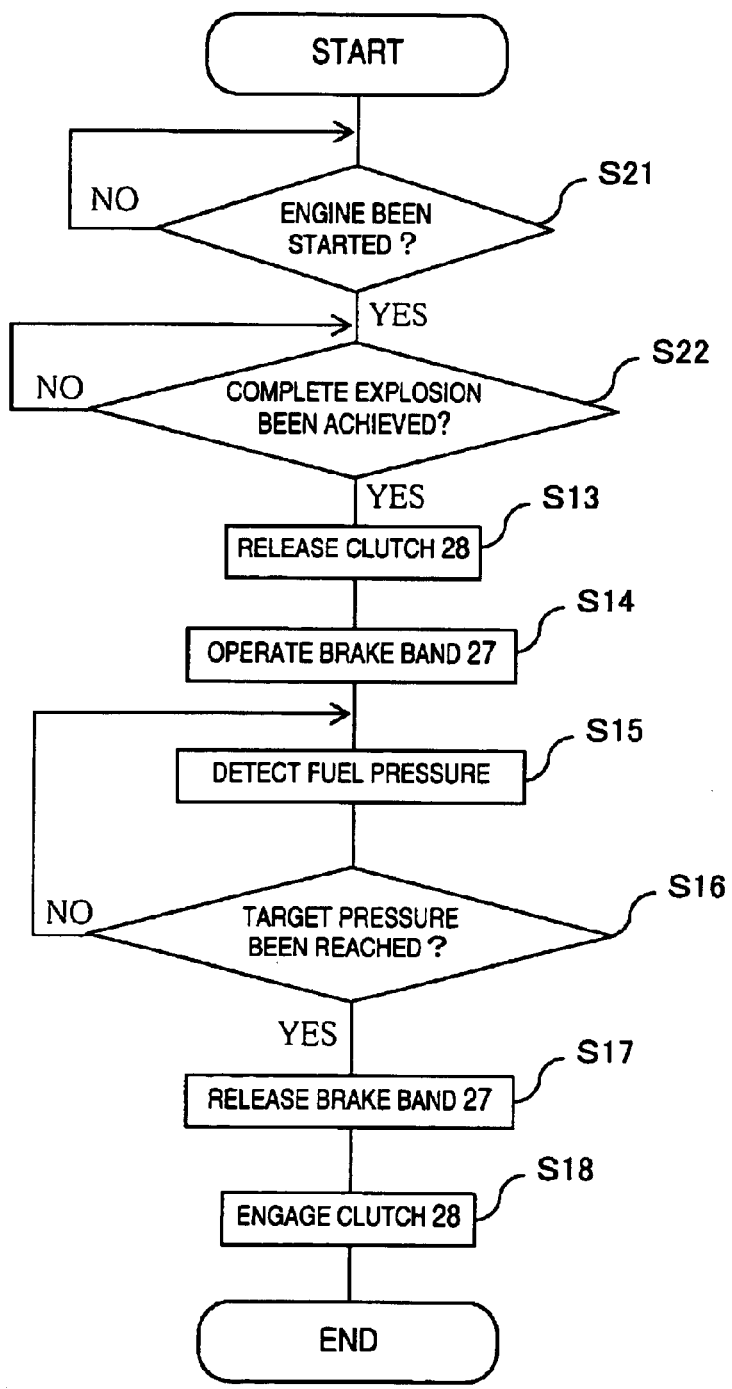
FIG. 3 is a flowchart showing the control flow of the first embodiment.

FIG. 3 is a flowchart showing the control flow for the engine control unit ECU used to carry out the functions of the present invention in accordance with the first embodiment. In step S11, it is determined if the engine has been started, i.e., cranking (rotary driving) of the engine by the starter motor has started. In step S12, it is determined if the engine has been cranked to complete explosion, i.e., if the engine is operating independently by combusting fuel and is generating output without using the starter. Complete explosion can be determined by using a known rotational speed sensor to detect if the engine rotational speed has reached a target rotational speed, such as the idling speed Ne1 shown in FIG. 6(b).

If it is determined in steps S11 and S12 that the engine has been cranked to complete explosion, then control proceeds to steps S13 and S14 to operate the planetary gear mechanism SA. In step S13 the clutch 28 is released and in step S14 the brake band 27 is operated, thereby increasing the rotational speed of the high-pressure fuel pump 4 to the high pump rotational speed. In other words, the pump 4 is rotated at a speed increase ratio of $I=1/(1+Za2/Za1)$ with respect to the rotational speed of the input shaft 21, which corresponds to the engine rotational speed.

In step S15, the fuel pressure inside the common rail 3 is detected with the fuel pressure sensor 7. In step S 16, it is determined if the fuel pressure has reached the target pressure. In view of current common rail pressures, the specific target pressure value is preferably approximately 1000 to 2000 bar. However, it is feasible that even higher pressures values (e.g., 5000 bar) will be used in the future. In any event, the setting value for the target pressure value is preferably a pressure value that is required when normal operation is performed after engine warm-up is completed or for the engine to operate in a desired manner.

If the target pressure has not been reached, the high-pressure fuel pump 4 is maintained at the high pump rotational speed. If the target pressure has been reached, the brake band 27 is quickly released (step S17) and the clutch 28 is fastened (step S18) so that the high-pressure fuel pump 4 is run at the normal pump rotational speed.

When the planetary gear mechanism 5A is not operated, it is held by the holding mechanism 30 (return spring or other mechanical holding mechanism) in such a state that the brake band 27 is constantly released and the clutch 28 is constantly fastened and the steps S13 to S16 are essentially omitted.

Although the embodiment just described is configured such that the high-speed pump operation is stopped when the fuel pressure detected by the pressure sensor 7 reaches the target pressure, the present invention is not limited to such a configuration. For example, it is also acceptable to take advantage of the fact that the fuel pressure rises as the engine warms up during normal operation. By establishing and storing a map or table of the correlation between the warm-up state and the fuel pressure in advance and detecting the warm-up state of the engine based on a detection value obtained from an oil/coolant temperature sensor (not shown), it can be determined if the fuel pressure has reached the target pressure by determining when the warming up of the engine is complete and referring to the map or table. Then, when it is determined that the fuel pressure has reached the target pressure, the pump rotational speed is returned from the high pump rotational speed to the normal pump rotational speed.

Second Embodiment

Figure 4:
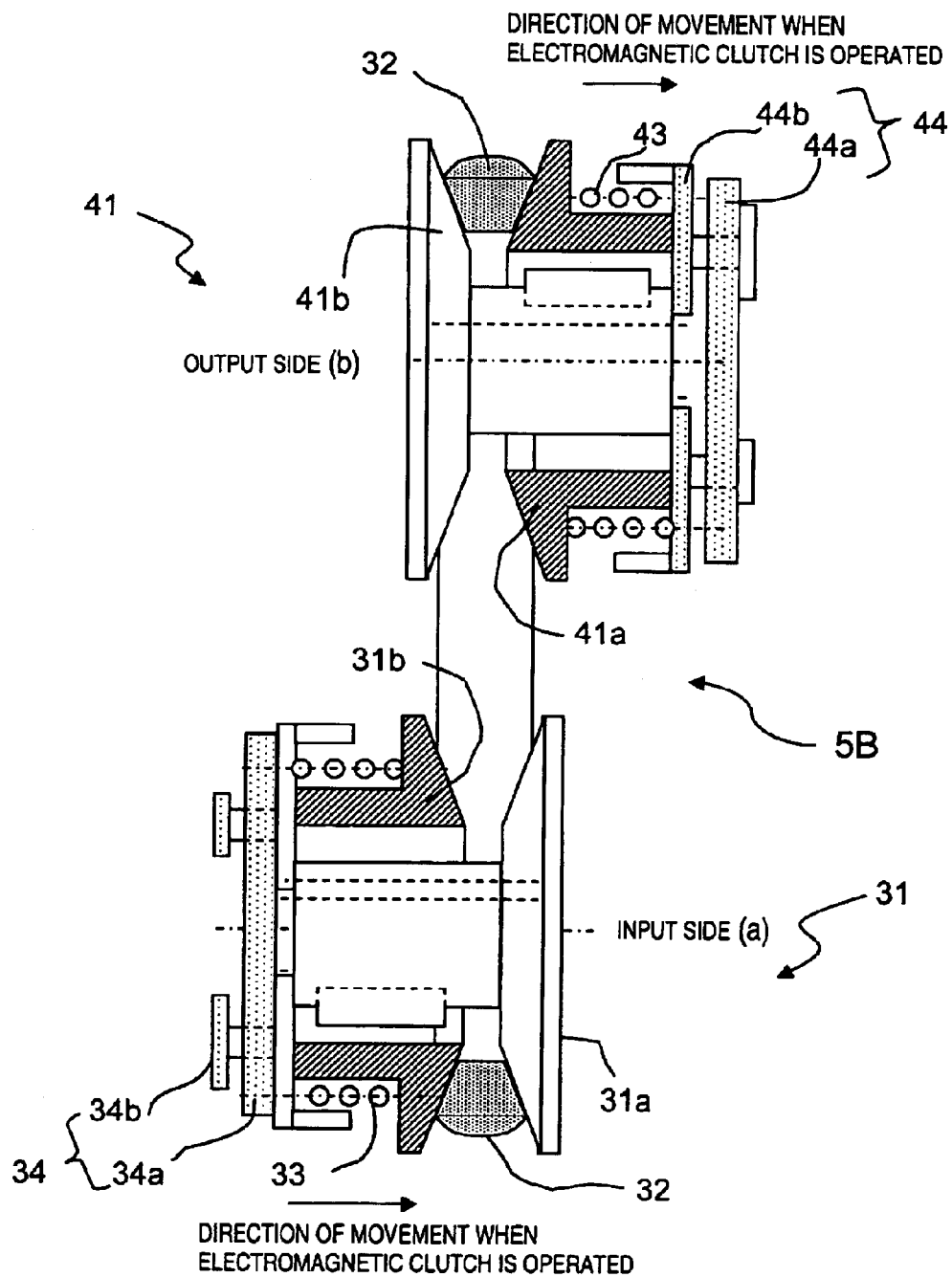
FIG. 4 is a cross sectional view showing a variable rotation ratio transmission mechanism in accordance with a second embodiment of the present invention.

Referring now to FIG. 4, a variable rotation ratio transmission mechanism 5 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The variable rotation ratio transmission mechanism 5 according to a second embodiment uses a variable endless drive mechanism SB that is a V-belt speed changing mechanism that essentially comprises a V-belt and pulley arrangement that is commonly known as a continuously variable transmission for a vehicle power train.

On the input side (a) of this variable endless drive mechanism SB, the variable endless drive mechanism 5B includes an input-side pulley 31 that has an input-side stationary pulley half 31a and an input-side moveable pulley half 31b. The input-side stationary pulley half 31a is connected to the crankshaft 18 of the engine while the input-side moveable pulley half 31b faces the input-side stationary pulley half 31a and is configured to adjust the effective diameter of the input-side pulley 31. On the output side (b) of this variable endless drive mechanism 5B, the variable endless drive mechanism 5B includes an output-side pulley 41 that has an output-side stationary pulley half 41a and an output-side moveable pulley half 41b. The output-side stationary pulley half 41a transmits engine output to the high-pressure fuel pump 4. The output-side moveable pulley half 41b faces the output-side stationary pulley half 41a and is configured to adjust the effective diameter of the output-side pulley 41. One V-belt 32 is arranged on these pulleys 31 and 41. The input side (a) is further provided with an input-side spring 33 that presses the input-side moveable pulley half 31b toward the side (left side in figure) corresponding to the normal pump rotational speed and an input-side electromagnetic clutch 34 for moving the input-side moveable pulley half 31b toward the side (direction of arrow in figure) corresponding to the high pump rotational speed. Similarly, the output side (b) is provided with an output-side spring 43 that presses the output-side moveable pulley half 41b toward the side (left side in figure) corresponding to the normal pump rotational speed and an output-side electromagnetic clutch 44 for moving the output-side moveable pulley half 41b toward the side (direction of arrow in figure) corresponding to the high pump rotational speed.

On the input side (a), when the electromagnetic clutch 34 is turned ON, i.e., when the coil 34a is electrically energized, the iron piece 34b provided in the moveable pulley half 31b is pulled there-toward and the moveable pulley half 31b moves toward the right in FIG. 4, causing the V-belt 32 to expand in the outward radial direction of the pulley 31. As a result, the radius of rotation of the V-belt 32 on the input side (a) increases. Meanwhile, when the electromagnetic clutch 34 is turned OFF, the tensile force of the spring 33 moves the moveable pulley half 31 b to the left in FIG. 4, returning to the normal radius of rotation. Similarly, on the output side (b), when the electromagnetic clutch 44 is turned ON, i.e., when the coil 44a is electrically energized, the iron piece 44b provided in the moveable pulley half 41b is pulled toward the coil 44a and the moveable pulley half 41b moves toward the right in FIG. 4. This causes the V-belt 32 to move further into the groove between the pulley halves 41a and 41b. As a result, the radius of rotation of the V-belt 32 on the output side (b) decreases. Meanwhile, when the electromagnetic clutch 44 is turned OFF, the tensile force of the spring 43 moves the moveable pulley half 41b to the left in FIG. 4, returning to the normal radius of rotation.

In this way, by operating the electromagnetic clutches 34 and/or 44 and thus changing the pulley ratio between the radius of rotation on the input side and the radius of rotation on the output side, the rotational speed of the high-pressure fuel pump 4 (i.e., the output side of the speed changing mechanism) is increased with respect to the rotational speed of the engine (i.e., the input side of the speed changing mechanism). Similarly to the first embodiment, the fuel pressure can be increased early without increasing the cranking load by operating both the input-side electromagnetic clutch 34 and the output-side electromagnetic clutch 44, thereby increasing the rotational speed of the high-pressure fuel pump 4, in the initial stage of engine starting after cranking.

Figure 5:
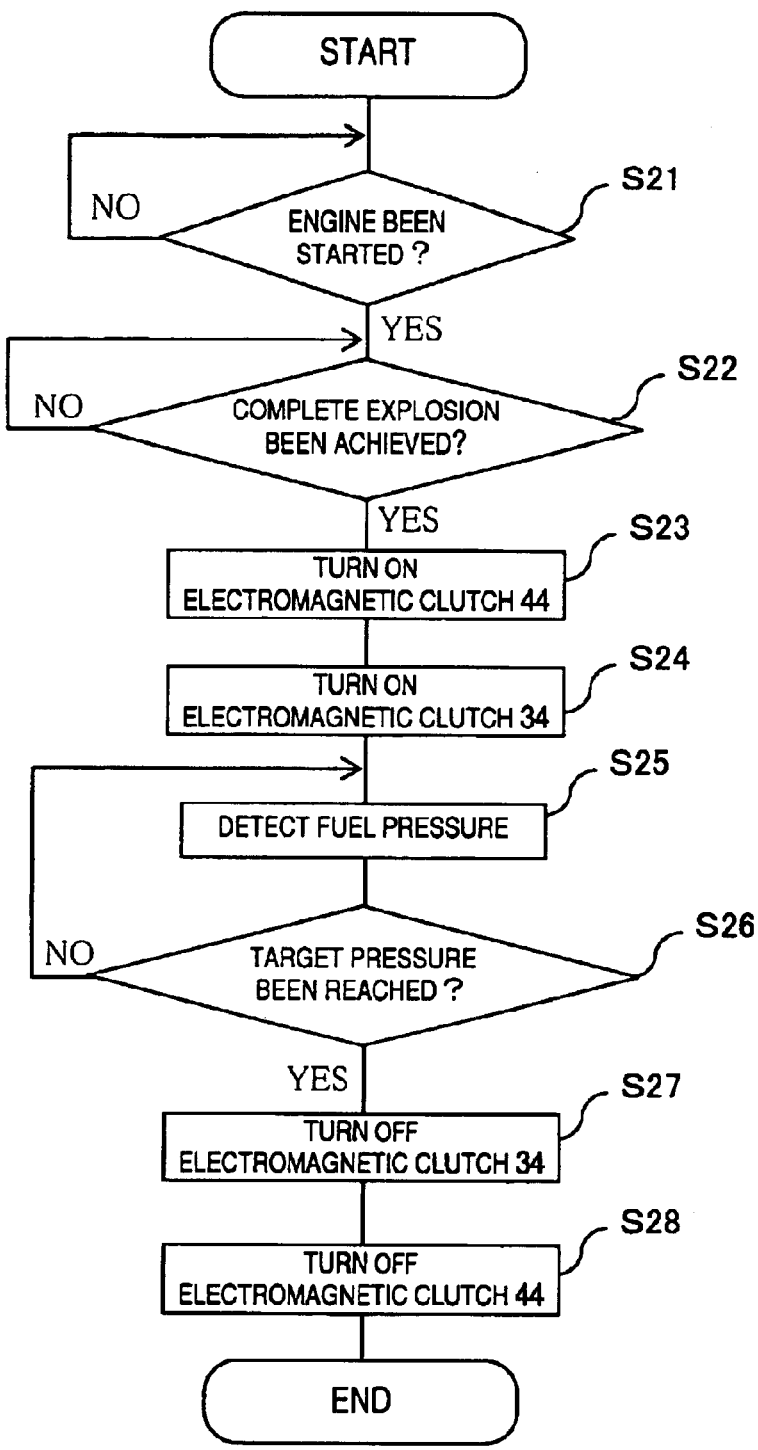
FIG. 5 is a flowchart showing the control flow of the second embodiment of the present invention.

FIG. 5 is a flowchart showing the control flow for the engine control unit ECU used to carry out the functions of the present invention in accordance with the second embodiment. In step S21 it is determined if cranking of the engine by the starter motor has begun and in step S22 it is determined if the engine has reached complete explosion. If it is determined that the engine has been cranked to complete explosion, control proceeds to steps S23 and S24 and the variable endless drive mechanism 5B is operated. That is, in step S23 the output-side electromagnetic clutch 44 is operated and in step S24 the input-side electromagnetic clutch 34 is operated. As a result, the pulley ratio between the radius of rotation on the input side and the radius of rotation on the output side is changed so as to achieve a fixed speed increase ratio and the pump rotational speed increases with respect to the engine rotational speed.

Then, in step S25 the fuel pressure inside the common rail 3 is detected with the fuel pressure sensor 7 and in step S26 it is determined if the fuel pressure has reached the target pressure. In view of current common rail pressures, the specific target pressure value is preferably approximately 1000 to 2000 bar. However, it is feasible that even higher pressures values (e.g., 5000 bar) will be used in the future. In any event, the setting value for the target pressure value is preferably a pressure value that is required when normal operation is performed after engine warm-up is completed or for the engine to operate in a desired manner.

If the target pressure has not been reached, the high-pressure fuel pump 4 is maintained at the high pump rotational speed. If the target pressure has been reached, control proceeds to steps S27 and S28 where the electromagnetic clutch 34 is turned OFF and the electromagnetic clutch 44 is turned OFF so that the high-pressure fuel pump 4 is run at the normal pump rotational speed.

In its non-operated state (initial state), the variable endless drive mechanism 5B is held mechanically and forcefully in setting state corresponding to the normal pump rotational speed by a holding mechanism comprising the pair of springs 33 and 43. As a result, even in the event that the variable endless drive mechanism 5B should not operate properly, the high-pressure fuel pump 4 will be driven at the normal pump rotational speed and the pump rotational speed will not increase unpredictably, thus providing excellent reliability.

The first and second embodiments are able to raise the fuel pressure inside the common rail 3 to the target pressure early in the initial stage of engine starting without inviting an increase in load during cranking. They accomplish this by adjusting the rotational speed of the high-pressure fuel pump to a rotational speed that is faster than a prescribed normal pump rotational speed only during the initial stage of engine starting after the engine has been cranked to complete explosion. Therefore, without increasing the capacity or size of the starter motor used to crank the engine, the fuel spray can be atomized by means of high-pressure fuel injection during the initial stage of engine starting, the combustion stability can be greatly improved, and the emission performance and fuel efficiency can be improved.

Although the previously described embodiments use comparatively simple and inexpensive mechanisms, i.e., the planetary gear mechanism 5A and the variable endless drive mechanism 5B, respectively, for the variable rotation ratio transmission mechanism that changes the rotational speed of the high-pressure fuel pump, it is also acceptable to use a speed changing mechanism that transmits rotation by means of friction, a chain driven mechanism, or another type of mechanism. Additionally, although the previously described embodiments are configured to shift the pump rotational speed between two stages, it is also acceptable to shift the pump rotational speed in three stages or in a continuously variable manner according to the engine rotational speed.

Now, the technical concepts that can be obtained from the embodiments will be discussed along with the effects.

An engine fuel delivery system according to the present invention has fuel injection valves provided for the cylinders of the engine, a high-pressure fuel pump driven by the engine output, and an accumulator vessel provided in a high-pressure line connecting the high-pressure fuel pump to the fuel injection valves.

In accordance with a first aspect of the present invention, a variable rotation ratio transmission mechanism that can vary the drive rotation ratio is provided in the power transmission path between the engine and the high-pressure fuel pump, the variable rotation ratio transmission mechanism serving to control the rotational speed of the high-pressure fuel pump to a rotational speed that is higher than the normal pump rotational speed during the initial stage of engine starting after complete engine explosion has been achieved by cranking. This first aspect of the present invention makes it possible to raise the pressure inside the accumulator vessel to the target pressure early and achieve atomization of the fuel spray through high-pressure fuel injection even during the initial stage of engine starting. As a result, the period of unstable combustion during the initial stage of engine starting is greatly shortened and the fuel efficiency and emission performance can be improved. Furthermore, since the rotational speed of the high-pressure fuel pump is increased after cranking, the load imposed by the high-pressure fuel pump is not increased before cranking and it is not necessary to increase the size and/or capacity of the starter motor used to crank the engine.

In accordance with a second aspect of the present invention, the variable rotation ratio transmission mechanism is configured such that it can switch between a normal pump rotational speed that is a fixed ratio of the engine rotational speed and a high pump rotational speed that is a fixed ratio of the engine speed and faster than the normal pump rotational speed. The second aspect of the present invention makes it possible to achieve a comparatively simple variable rotation ratio transmission device that shifts between two speeds.

In accordance with a third aspect of the present invention, a pressure detecting means configured to detect the fuel pressure inside the accumulator vessel is provided and the rotational speed of the high-pressure fuel pump is held at a high pump rotational speed until the fuel pressure reaches a target fuel pressure. In the third aspect of the present invention, the rotational speed of the high-pressure fuel pump is held at a high rotational speed only until the target fuel pressure is reached and unnecessary increasing of the pump rotational speed can be prevented/avoided.

In accordance with a fourth aspect of the present invention, the variable rotation ratio transmission mechanism is provided with a holding mechanism configured to mechanically hold the variable rotation ratio transmission mechanism in the normal pump rotational speed setting condition when the variable rotation ratio transmission mechanism is in a non-operated state.

With the fourth aspect of the present invention, in the event that the variable rotation ratio transmission mechanism should not operate properly due to a mechanical failure or the like, the pump rotational speed is reliably prevented from increasing excessively because the holding mechanism holds the pump rotational speed at the normal pump rotational speed.

In accordance with a fifth aspect of the present invention, the variable rotation ratio transmission mechanism is an inexpensive and highly reliable planetary gear mechanism.

In accordance with a sixth aspect of the present invention, the variable rotation ratio transmission mechanism is a simply-constructed and lightweight V-belt speed changing mechanism having a V-belt and a pair of pulleys.

In accordance with a seventh aspect of the present invention, the rotational speed of the high-pressure fuel pump is controlled to the normal pump rotational speed after the engine has finished warming up. The seventh aspect of the present invention makes it possible to prevent excessive increasing of the pump rotational speed.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-330145. The entire disclosure of Japanese Patent Application No. 2002-330145 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel delivery system comprising:
a plurality of fuel injection valves configured and arranged to inject fuel into cylinders of an engine;
a high-pressure fuel pump configured and arranged to be driven by an engine output at a pump rotational speed to pressurize the fuel to be injected by the fuel injection valves;
an accumulator vessel configured and arranged to be provided in a high pressure line connecting the high-pressure fuel pump to the fuel injection valves; and
a variable transmission mechanism configured and arranged to vary a drive rotational ratio in a power transmission path between the engine output and an input of the high-pressure fuel pump, the variable transmission mechanism being configured and arranged to control the pump rotational speed of the high-pressure fuel pump to a prescribed high pump rotational speed that is higher than a prescribed normal pump rotational speed used during an initial stage of engine starting after complete engine explosion has been achieved by cranking.

2. The engine fuel delivery system recited in claim 1, wherein
the variable transmission mechanism is configured to switch between the prescribed normal pump rotational speed that uses a specific ratio of the engine rotational speed and the prescribed high pump rotational speed that uses a specific ratio of the engine speed and faster than the normal pump rotational speed.

3. The engine fuel delivery system recited in claim 1, wherein
the accumulator vessel includes a pressure detecting device configured and arranged to detect a fuel pressure inside the accumulator vessel, and
the pump rotational speed of the high-pressure fuel pump is configured and arranged to be held at the prescribed high pump rotational speed until a prescribed target fuel pressure is reached as detected by the pressure detecting device.

4. The engine fuel delivery system recited in claim 1, wherein
the variable transmission mechanism includes a holding mechanism configured and arranged to mechanically hold the variable transmission mechanism in the normal pump rotational speed setting condition when the variable transmission mechanism is in a non-operational state.

5. The engine fuel delivery system recited in claim 1, wherein
the variable transmission mechanism includes a planetary gear mechanism coupled to the high-pressure fuel pump.

6. The engine fuel delivery system recited in claim 1, wherein
the variable rotation ratio transmission mechanism includes a variable endless drive mechanism having a drive belt and a pair of pulleys.

7. The engine fuel delivery system recited in claim 1, wherein
the pump rotational speed of the high-pressure fuel pump is controlled to the normal pump rotational speed after the engine has finished warming up.

8. The engine fuel delivery system recited in claim 2, wherein
the accumulator vessel includes a pressure detecting device configured and arranged to detect a fuel pressure inside the accumulator vessel, and
the pump rotational speed of the high-pressure fuel pump is configured and arranged to be held at the prescribed high pump rotational speed until a prescribed target fuel pressure is reached as detected by the pressure detecting device.

9. The engine fuel delivery system recited in claim 8, wherein
the variable transmission mechanism includes a holding mechanism configured and arranged to mechanically hold the variable transmission mechanism in the normal pump rotational speed setting condition when the variable transmission mechanism is in a non-operational state.

10. The engine fuel delivery system recited in claim 8, wherein
the variable transmission mechanism includes a planetary gear mechanism coupled to the high-pressure fuel pump.

11. The engine fuel delivery system recited in claim 8, wherein
the variable rotation ratio transmission mechanism includes a variable endless drive mechanism having a drive belt and a pair of pulleys.

12. The engine fuel delivery system recited in claim 8, wherein
the pump rotational speed of the high-pressure fuel pump is controlled to the normal pump rotational speed after the engine has finished warming up.

13. The engine fuel delivery system recited in claim 3, wherein
the variable transmission mechanism includes a planetary gear mechanism coupled to the high-pressure fuel pump.

14. The engine fuel delivery system recited in claim 3, wherein
the variable rotation ratio transmission mechanism includes a variable endless drive mechanism having a drive belt and a pair of pulleys.

15. The engine fuel delivery system recited in claim 3, wherein
the pump rotational speed of the high-pressure fuel pump is controlled to the normal pump rotational speed after the engine has finished warming up.

16. An engine fuel delivery system comprising:
fuel injection means for injecting fuel into cylinders of an engine;
high-pressure fuel pumping means for pressurizing the fuel to the fuel injection means;
fuel accumulating means for connecting the high-pressure fuel pumping means to the fuel injection means; and
variable transmission means to vary a drive rotational ratio in a power transmission path between the engine output and an input of the high-pressure fuel pumping means, the variable transmission means being configured and arranged to control the pump rotational speed of the high-pressure fuel pumping means to a prescribed high pump rotational speed that is higher than a prescribed normal pump rotational speed used during an initial stage of engine starting after complete engine explosion has been achieved by cranking.

17. A method of controlling fuel injection into cylinders of an engine comprising:

injecting fuel into cylinders of an engine;

pressurizing the fuel being injected into the cylinders;

varying the pressure of the fuel by changing a drive rotational ratio in a power transmission path between the engine output and an input of a high-pressure fuel pump after complete engine explosion has been achieved by cranking such that a pump rotational speed of the high-pressure fuel pump is increased to a prescribed high pump rotational speed that is higher than a prescribed normal pump rotational speed used during an initial stage of engine starting prior to complete engine explosion.

18. The method recited in claim 17, wherein the varying of the pressure of the fuel is performed by using a specific ratio of the engine rotational speed when pumping at the prescribed normal pump rotational speed and using a specific ratio of the engine speed that is faster than the normal pump rotational speed when pumping at the prescribed high pump rotational speed.

19. The method recited in claim 17, further comprising detecting a fuel pressure inside a accumulator vessel, and maintaining the pump rotational speed of the high-pressure fuel pump at the prescribed high pump rotational speed until a prescribed target fuel pressure is reached.

20. The method recited in claim 17, further comprising controlling the pump rotational speed of the high-pressure fuel pump to the normal pump rotational speed after the engine has finished warming up.

* * * * *